United States Patent
Inbaraj et al.

(10) Patent No.: US 8,762,752 B2
(45) Date of Patent: Jun. 24, 2014

(54) SYSTEM AND METHOD FOR REMOTELY MANAGING ELECTRIC POWER USAGE OF TARGET COMPUTERS

(75) Inventors: Joseprabu Inbaraj, Suwanee, GA (US); Chittaraiah Pabba, Cumming, GA (US)

(73) Assignee: American Megatrends, Inc., Norcross, GA (US)

( * ) Notice: Subject to any disclaimer, the term of this patent is extended or adjusted under 35 U.S.C. 154(b) by 322 days.

(21) Appl. No.: 13/237,512

(22) Filed: Sep. 20, 2011

(65) Prior Publication Data

US 2013/0073882 A1   Mar. 21, 2013

(51) Int. Cl.
  *G06F 1/26*   (2006.01)
  *G06F 1/32*   (2006.01)
(52) U.S. Cl.
  USPC .............................................. 713/320
(58) Field of Classification Search
  None
  See application file for complete search history.

(56) References Cited

U.S. PATENT DOCUMENTS

| | | | |
|---|---|---|---|
| 7,467,311 B2 * | 12/2008 | Bahali et al. | 713/320 |
| 2003/0065961 A1 * | 4/2003 | Koenen | 713/323 |
| 2009/0055665 A1 * | 2/2009 | Maglione et al. | 713/320 |

* cited by examiner

*Primary Examiner* — Thomas Lee
*Assistant Examiner* — Zhipeng Wang
(74) *Attorney, Agent, or Firm* — Morris Manning & Martin, LLP; Tim Tingkang Xia, Esq.

(57) ABSTRACT

In one aspect, a system for remotely managing electric power usage of a plurality of target computers is disclosed. In one embodiment, the system includes a plurality of target computers arranged in a group, each using electric power at a rate associated with a corresponding duty cycle and power rating. A remote management computer is communicatively connected to the group of target computers and operative to receive user input data including a total group power usage limit and a priority assignment, minimum duty cycle setting, and/or power zone setting for at least one of the target computers. A power controller is operative to remotely control the power usage of the target computers according to the corresponding user input data, to cause the total group power usage to be at or below the group power usage limit.

26 Claims, 7 Drawing Sheets

SYSTEM AND METHOD FOR REMOTELY MANAGING ELECTRIC POWER USAGE OF TARGET COMPUTERS

FIELD OF THE INVENTION

The present invention generally relates to remote management computing, and more particularly to remotely managing electric power usage of a plurality of target computers.

BACKGROUND OF THE INVENTION

A typical data center facility houses server computers, switches, and power distribution units (PDUs). Multiple server computers may be collectively provided in a mounting chassis commonly referred to as a "rack," and PDUs can be configured with multiple appliance outlets designed to distribute and monitor electric power for computers and network equipment within a data center. Existing data centers are not able to selectively limit the power usage of server computers in an aggregated fashion, and hence all server computers draw required power from the PDUs irrespective of real-time current loads and conditions in the data center, resulting in wasted energy. Among other needs, there exists a need to manage data center power usage without adding new hardware or software agents to existing rack configurations while also meeting minimum duty cycle criteria associated with processors of the server computers. Further, there exists a need to provide for scheduling and implementation of user-customized power management policies.

Therefore, heretofore unaddressed needs still exist in the art to address the aforementioned deficiencies and inadequacies.

SUMMARY OF THE INVENTION

In one aspect, the present invention relates to a system for remotely managing electric power usage of a plurality of target computers. In one embodiment, the system includes a plurality of target computers arranged in a group, where each target computer in the group uses electric power at a rate associated with a corresponding duty cycle and power rating. The sum of the power usage for each of the target computers in the group forms a total group power usage. The system also includes a remote management computer that is communicatively connected to the group of target computers over a communications link. The remote management computer is operative to receive user input data that includes a total group power usage limit and at least one of a priority assignment, minimum duty cycle setting, and power zone setting for at least one of the target computers, in response to an action of a user. The system further includes a power controller that is operatively coupled to the target computers and communicatively connected to the remote management computer over the communications link. The power controller is operative to control the power usage of each of the target computers according to the corresponding user input data, to cause the total group power usage to be at or below the group power usage limit.

In one embodiment, the minimum duty cycle setting for a particular one of the target computers is associated with a minimum amount of time, over a predetermined period of time, that a target computer is at least partially operative to perform at least one computing function for a remote computer. The priority assignment for a particular one of the target computers is associated with the importance of at least one particular computing function performed by the target computer relative to at least one different computing function performed by at least one of the other target computers in the group. The power zone setting for a particular target computer is associated with the power rating of a particular one of the target computers relative to at least one of a predetermined range of power rating values and a power rating of the target computer relative to the other target computers in the group.

In one embodiment, the power controller includes at least one power distribution unit (PDU) that is operatively connected to a main power input and operative to provide power to the target computers according to the user input data.

In one embodiment, causing the total group power usage to be at or below the group power usage limit includes causing the at least one PDU to selectively reduce the duty cycle of a particular at least one of the target computers to a reduced duty cycle, according to at least one of the corresponding priority assignment and power zone setting for the particular at least one target computer, and such that the reduced duty cycle is at or above the corresponding minimum duty cycle.

In one embodiment, the power controller further includes a power usage monitor that is operative to monitor power usage of each of the target computers and to monitor the total group power usage. The power controller is operative to provide corresponding power usage data to the remote management computer over the communications link. Monitoring the power usage of each of the target computers and the total group power usage includes determining the power usage of each of the target computers and the total group power usage over a predetermined period of time, respectively.

In one embodiment, causing the total group power usage to be at or below the predetermined group power usage limit further includes causing the power usage monitor to perform functions that include determining the total group power usage over the predetermined amount of time prior to the reduction of the duty cycle and after the reduction of the duty cycle. The functions further include, if the power usage monitor determines that the total group power usage exceeds the group power usage limit after the reduction of the duty cycle of the at least one of the target computers, performing one of the functions of reducing the duty cycle of an additional at least one of the target computers according to the user input data, and alerting the user to adjust at least one of the priority and power zone setting for at least one of the target computers.

In one embodiment, the communications link includes at least one of a WAN connection, LAN connection, and internet connection.

In one embodiment, the communications link includes an internet connection and the remote management computer is further operative to display a web-based user interface with user controls to the user. The user input data is received in response to an interaction of the user with at least one of the displayed user controls.

In one embodiment, the target computers in the group are co-located at a data center. In another aspect, the present invention relates to a computer-readable medium with stored computer-executable instructions which, when executed by one or more processors, perform functions for remotely managing electric power usage of a group of target computers. In one embodiment, the functions include receiving user input data in response to an interaction of a user with a remote management computer that is communicatively connected to a group of target computers over a communications link. Each target computer in the group uses electric power at a rate associated with a corresponding duty cycle and power rating. The sum of the electric power usage of each of the target computers forms a total group power usage, and the input data includes a power usage limit for the group of target computers and at least one of a priority assignment, minimum duty cycle setting, and power zone setting for at least one of target computers. The functions further include causing a power controller that is operatively coupled to the group of target computers, and that is communicatively connected to the remote management computer over the communications link, to control the power usage of at least one of the target computers according to the corresponding user input data, to cause the total group power usage to be at or below the group power usage limit.

In one embodiment, the minimum duty cycle setting for a particular one of the target computers is associated with a minimum amount of time, over a predetermined period of time, that the target computer is at least partially operative to perform at least one computing function. The priority assignment for a particular one of the target computers is associated with the importance of at least one particular computing function performed by the target computer relative to at least one different computing function performed by at least one of the other target computers. The power zone setting for a particular one of the target computers is associated with the power rating of the target computer relative to at least one of a predetermined range of power rating values and a power rating of the particular target computer relative to the other target computers.

In one embodiment, the power controller includes at least one power distribution unit (PDU) that is operatively connected to a main power input and that is operative to provide power to the target computers according to the user input data.

In one embodiment, causing the total group power usage to be at or below the group power usage limit includes causing the at least one PDU to selectively reduce the duty cycle of a particular at least one of the target computers to a reduced duty cycle, according to at least one of the corresponding priority assignment and power zone setting for the at least one target computer, and such that the reduced duty cycle is above the minimum duty cycle for the particular at least one target computer.

In one embodiment, the power controller further includes a power usage monitor that is operative to monitor power usage of each of the target computers and the total group power usage, and to provide corresponding power usage data to the remote management computer over the communications link. Monitoring the power usage of each of the target computers and the total group power usage includes determining the power usage of each of the target computers and the total group power usage over a predetermined period of time, respectively.

In one embodiment, causing the total group power usage to be at or below the predetermined group power usage limit further includes the function of causing the power usage monitor to determine the total group power usage over the predetermined amount of time prior to the reduction of the duty cycle and after the reduction of the duty cycle. Causing the total group power usage to be at or below the predetermined group power usage limit further includes, if the power usage monitor determines that the total group power usage exceeds the group power usage limit after the reduction of the duty cycle of the at least one of the target computers, causing the at least one PDU to further perform one of the functions of reducing the duty cycle of an additional at least one of the target computers according to the user input data and alerting the user to adjust at least one of the priority assignment and power zone setting for at least one of the target computers.

In one embodiment, the communications link includes at least one of a WAN connection, LAN connection, and internet connection.

In one embodiment, the communications link includes an internet connection and the functions performed further include causing the remote management computer to display a web-based user interface with user controls, and the user input data is received in response to an interaction of the user with at least one of the displayed user controls.

In one embodiment, the target computers in the group are co-located at a data center.

In yet another aspect, the present invention relates to a computer-readable medium with stored computer-executable instructions which, when executed by one or more processors, perform functions for remotely managing electric power usage of a rack of server computers. In one embodiment, the functions include receiving user input data from a user of a web-based graphical user interface displayed on a remote management computer that is communicatively connected to a rack of server computers over an internet connection, in response to an interaction of the user with the graphical user interface. Each server computer in the rack uses electric power at a rate associated with a corresponding duty cycle and power rating, and the sum of the electric power usage of each of the server computers forms a total rack power usage. The input data includes a power usage limit for the rack of server computers and at least one of a priority assignment, minimum duty cycle setting, and power zone setting for at least one of the server computers. The functions further include causing a power controller that is operatively coupled to the rack of server computers, and that is communicatively connected to the remote management computer over the internet connection, to control the power usage of each of the server computers according to the corresponding user input data to cause the total rack power usage to be at or below the rack power usage limit.

In one embodiment, the minimum duty cycle setting for a particular one of the server computers is associated with a minimum amount of time, over a predetermined period of time, that the server computer is at least partially operative to perform at least one computing function for a remote computer. The priority assignment for a particular one of the server computers is associated with the importance of at least one particular computing function performed by the server computer relative to the importance of at least one different computing function performed by at least one of the other server computers. The power zone setting for a particular server computer in the rack is associated with the power rating of a particular one of the target computers relative to at least one of a predetermined range of power rating values and a power rating of the particular one of the target computers relative to the power rating of each of the other server computers.

In one embodiment, the power controller includes at least one power distribution unit (PDU) that is operatively connected to a main power input and that is operative to provide power to at least one of the server computers.

In one embodiment, causing the total rack power usage to be at or below the rack power usage limit includes causing the at least one PDU to selectively reduce the duty cycle of a particular one of the server computers having at least one of a lower priority than at least one of the other server computers and a higher power zone setting than at least one of the other server computers.

In one embodiment, the power controller further includes a power usage monitor that is operative to monitor power usage of each of the server computers and the total rack power usage and to provide corresponding power usage data to the remote management computer over the communications link.

In one embodiment, monitoring the power usage of each of the server computers and the total rack power usage includes determining the power usage of each of the server computers and the total rack power usage over a predetermined period of time, respectively.

In one embodiment, causing the total rack power usage to be at or below the predetermined group power usage limit further includes causing the power usage monitor to determine the total rack power usage over the predetermined amount of time prior to the reduction of the duty cycle and after the reduction of the duty cycle. Causing the total rack power usage to be at or below the predetermined group power usage limit also includes, if it is determined by the power usage monitor that the total rack power usage exceeds the rack power usage limit after the reduction of the duty cycle of the at least one of the server computers, performing one of the functions of causing the at least one PDU to reduce the duty cycle of an additional at least one of the server computers according to the user input data and alerting the user to adjust at least one of the priority assignment and power zone setting for at least one of the server computers.

In one embodiment, the functions performed further include, if the power usage monitor determines that the total rack power usage exceeds the rack power usage limit after the reduction of the duty cycle of the at least one of the server computers, causing the at least one PDU to reduce the duty cycle of additional server computers in the rack until the total rack power usage is at or below the rack power usage limit.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
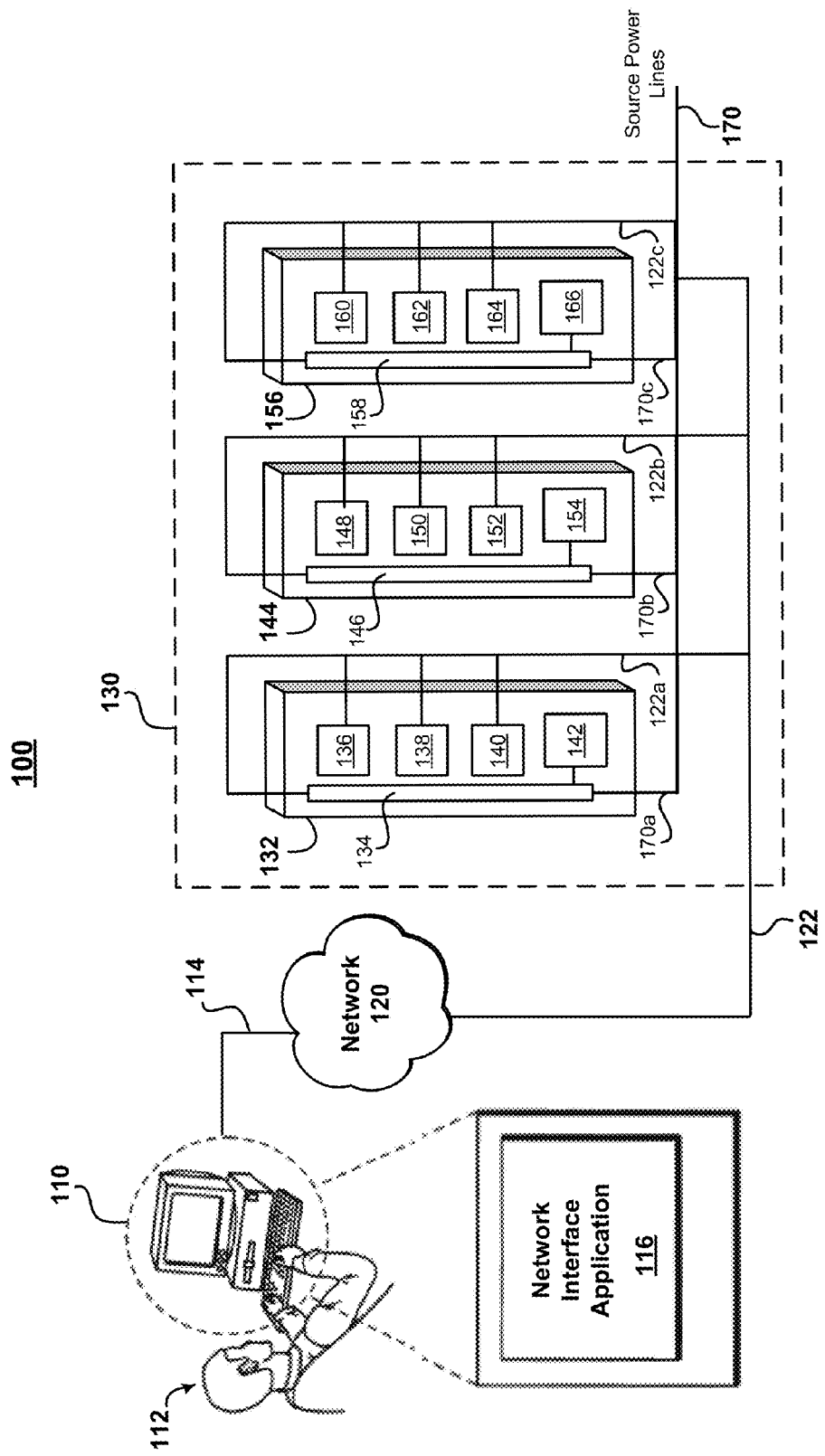
FIG. 1 schematically shows a computer system for remote management of electric power usage of a plurality of target computers, according to one embodiment of the present invention.

The present invention is more particularly described in the following examples that are intended as illustrative only, since numerous modifications and variations therein will be apparent to those skilled in the art. Various embodiments of the invention are now described in detail.

Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-7.

Now referring to FIGS. 1-7, in one aspect, the present invention relates to a system 100 for remotely managing electric power usage of a plurality of target computers. In one embodiment, the system 100 includes a plurality of target computers 136, 138, 140 arranged in a group 133, where each of the target computers 136, 138, 140 in the group 133 uses electric power at a rate associated with a corresponding duty cycle and power rating, and the sum of the power usage for each of the target computers 136, 138, 140 in the group 133 forms a total group power usage. The system 100 also includes a remote management computer 110 that is communicatively connected to the group 133 of target computers 136, 138, 140 over a communications link 122. The remote management computer 110 is operative to receive user input data including a total group power usage limit and at least one of a priority assignment, minimum duty cycle setting, and power zone setting for at least one of the target computers 136, 138, 140, in response to an action of a user 112. The system 100 further includes a power controller 143 that is operatively coupled to the target computers 136, 138, 140 and communicatively connected to the remote management computer 110 over the communications link 122. The power controller 143 is operative to control the power usage of each of the target computers 136, 138, 140, according to the corresponding user input data, to cause the total group power usage to be at or below the group power usage limit.

In one embodiment, the minimum duty cycle setting for a particular one of the target computers 136, 138, 140 is associated with a minimum amount of time, over a predetermined period of time, that a target computer is at least partially operative to perform at least one computing function for a remote computer. The priority assignment for a particular one of the target computers 136, 138, 140 in the group 133 is associated with the importance of at least one particular computing function performed by the target computer relative to at least one different computing function performed by at least one of the other target computers in the group 133. The power zone setting for a particular target computer is associated with the power rating of a particular one of the target computers 136, 138, 140 relative to at least one of a predetermined range of power rating values and a power rating of the target computer relative to the other target computers in the group 133.

In one embodiment, the power controller 143 includes at least one power distribution unit (PDU) 134 that is operatively connected to a main power input 170. The at least one PDU 134 is operative to provide power to the target computers 136, 138, 140 according to the user input data.

In one embodiment, causing the total group power usage to be at or below the group power usage limit includes causing the at least one PDU 134 to selectively reduce the duty cycle of a particular at least one of the target computers 136, 138, 140 to a reduced duty cycle, according to at least one of the corresponding priority assignment and power zone setting for the particular at least one target computer, and such that the reduced duty cycle is at or above the corresponding minimum duty cycle.

In one embodiment, the power controller 143 further includes a power usage monitor 142 that is operative to monitor power usage of each of the target computers 136, 138, 140 and the total group power usage, and to provide corresponding power usage data to the remote management computer 110 over the communications link 122. Monitoring the power usage of each of the target computers 136, 138, 140 and the total group power usage includes determining the power usage of each of the target computers 136, 138, 140 and the total group power usage over a predetermined period of time, respectively.

In one embodiment, causing the total group power usage to be at or below the predetermined group power usage limit further includes causing the power usage monitor 142 to perform functions that include determining the total group power usage over the predetermined amount of time prior to the reduction of the duty cycle and after the reduction of the duty cycle and, if the power usage monitor 142 determines that the total group power usage exceeds the group power usage limit after the reduction of the duty cycle of the at least one of the target computers 136, 138, 140, performing one of the functions of reducing the duty cycle of an additional at least one of the target computers 136, 138, 140 according to the user input data and alerting the user 112 to adjust at least one of the priority and power zone setting for at least one of the target computers 136, 138, 140.

In one embodiment, the communications link 122 includes at least one of a WAN connection, LAN connection, and internet connection.

In one embodiment, the communications link 122 includes an internet connection and the remote management computer 110 is further operative to display a web-based user interface 500, 600, 700 with user controls to the user 112. The user input data is received in response to an interaction of the user 112 with at least one of the displayed user controls.

In one embodiment, the target computers 136, 138, 140 in the group 133 are co-located at a data center 130.

In another aspect, the present invention relates to a computer-readable medium having stored computer-executable instructions which, when executed by one or more processors, perform functions 300 for remotely managing electric power usage of a group 133 of target computers 136, 138, 140. In one embodiment, the functions include, as shown in step 303, receiving user input data in response to an interaction of a user 112 with a remote management computer 110 that is communicatively connected to a group 133 of target computers 136, 138, 140 over a communications link 122. Each of the target computer 136, 138, 140 in the group 133 uses electric power at a rate associated with a corresponding duty cycle and power rating, and the sum of the electric power usage of each of the target computers 136, 138, 140 forms a total group power usage. The input data includes a power usage limit for the group 133 of target computers 136, 138, 140 and at least one of a priority assignment, minimum duty cycle setting, and power zone setting for at least one of the target computers 136, 138, 140. The functions further include, as shown in steps 305, 307, 309, 311, 313, 315, causing a power controller 143 that is operatively coupled to the group 133 of target computers 136, 138, 140 and communicatively connected to the remote management computer 110 over the communications link 122 to control the power usage of at least one of the target computers 136, 138, 140 according to the corresponding user input data, to cause the total group power usage to be at or below the group power usage limit.

In one embodiment, the minimum duty cycle setting for a particular one of the target computers 136, 138, 140 is associated with a minimum amount of time, over a predetermined period of time, that the target computer is at least partially operative to perform at least one computing function. The priority assignment for a particular one of the target computers 136, 138, 140 is associated with the importance of at least one particular computing function performed by the target computer relative to at least one different computing function performed by at least one of the other target computers. The power zone setting for a particular one of the target computers 136, 138, 140 is associated with the power rating of the target computer relative to at least one of a predetermined range of power rating values and a power rating of the particular target computer relative to the other target computers in the group 133. In one embodiment, the power controller 143 includes at least one power distribution unit (PDU) 134 that is operatively connected to a main power input and operative to provide power to the target computers 136, 138, 140 according to the user input data.

In one embodiment, the function shown in steps 305, 307, 309, 311, 313, 315 of causing the total group power usage to be at or below the group power usage limit includes the function of, as shown in step 311, causing the at least one PDU 134 to selectively reduce the duty cycle of a particular at least one of the target computers 136, 138, 140 to a reduced duty cycle according to at least one of the corresponding priority assignment and power zone setting for the at least one target computer, where the reduced duty cycle is above the minimum duty cycle for the particular at least one target computer.

In one embodiment, the power controller 143 further includes a power usage monitor 142 that is operative to monitor power usage of each of the target computers 136, 138, 140 and the total group power usage, and to provide corresponding power usage data to the remote management computer 110 over the communications link 122. As shown in step 305, the function of monitoring the power usage of each of the target computers 136, 138, 140 and the total group power usage includes determining the power usage of each of the target computers 136, 138, 140 and the total group power usage over a predetermined period of time, respectively. In one embodiment, the function shown in steps 305, 307, 309, 311, 313, 315 of causing the total group power usage to be at or below the predetermined group power usage limit further includes the function shown in steps 305, 307, 309, 311 of causing the power usage monitor 142 to determine the total group power usage over the predetermined amount of time prior to the reduction of the duty cycle and after the reduction of the duty cycle and, if the power usage monitor 142 determines that the total group power usage exceeds the group power usage limit after the reduction of the duty cycle of the at least one of the target computers 136, 138, 140, causing the at least one PDU 134 to further perform step 311 or step 313. In step 311, the duty cycle of an additional at least one of the target computers 136, 138, 140 is reduced according to the user input data. In step 313, the user 112 is alerted to adjust at least one of the priority assignment and power zone setting for at least one of the target computers 136, 138, 140. In one embodiment, the communications link 122 includes at least one of a WAN connection, LAN connection, and internet connection.

Figure 6:
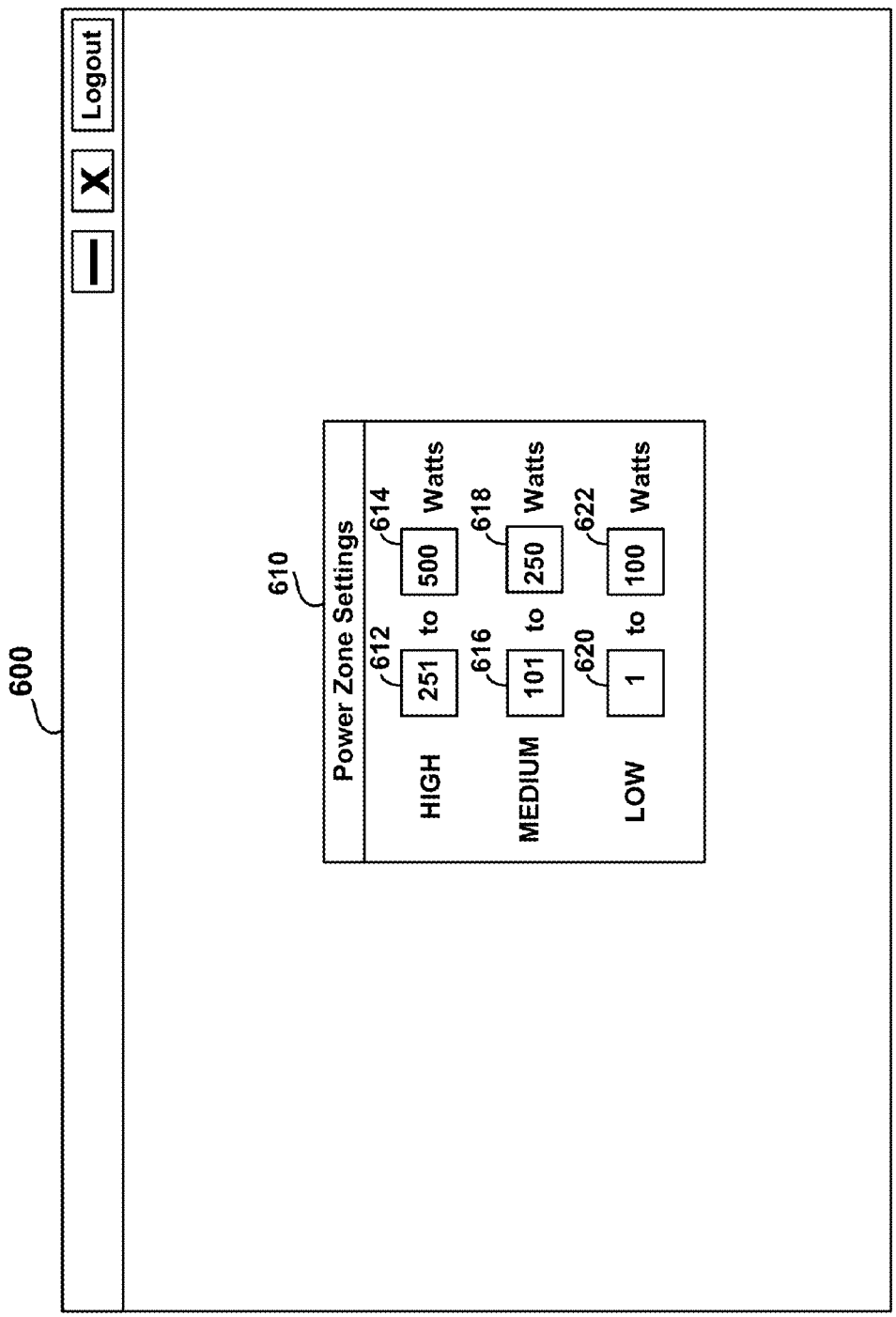
FIG. 6 illustrates a graphical user interface display with user input controls including controls for receiving user input associated with a power zone setting for one or more target computers, respectively, according to one embodiment of the present invention.
Figure 7:
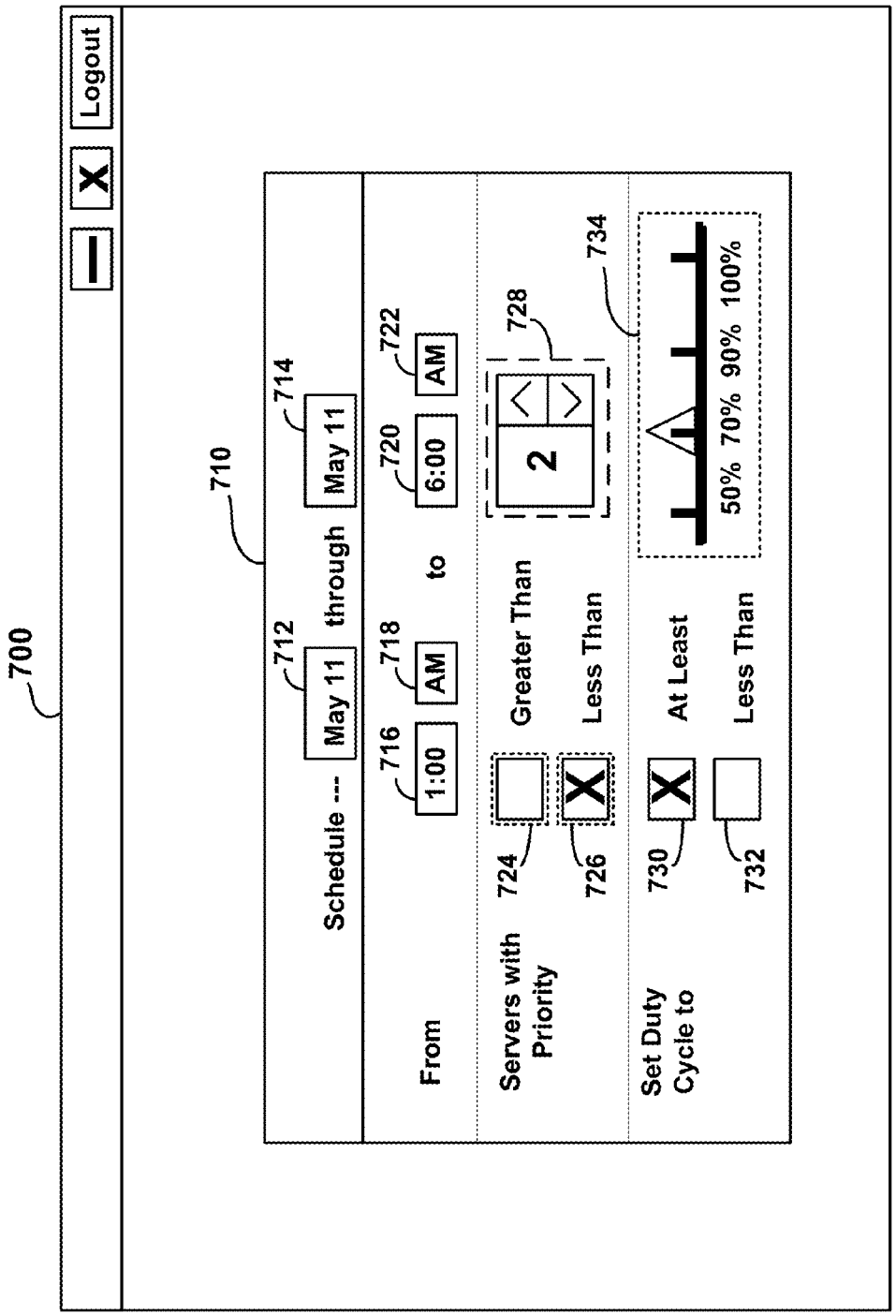
FIG. 7 illustrates a graphical user interface display with user input controls for receiving user input associated for configuring customized power management policies for racks and particular server computers and PDUs of a data center, according to one embodiment of the present invention.

In one embodiment, the communications link 122 includes an internet connection and the functions performed further include causing the remote management computer 110 to display a web-based user interface 500, 600, 700 with user controls 510-516, 530-534, 550-556 (FIG. 5), 610-622 (FIG. 6), 710-734 (FIG. 7). The user input data is received in response to an interaction of the user 112 with at least one of the displayed user controls.

In one embodiment, the target computers in the group 133 are co-located at a data center 130.

In yet another aspect, the present invention relates to a computer-readable medium with stored computer-executable instructions which, when executed by one or more processors, perform functions for remotely managing electric power usage of a rack 132, 133 of server computers 136, 138, 140. In one embodiment, the functions include, as shown in step 303, receiving user input data from a user 112 of a web-based graphical user interface 500, 600, 700 that is displayed on a remote management computer 110 communicatively connected to a rack 132, 133 of server computers 136, 138, 140 over an internet connection 122, in response to an interaction of the user 112 with the graphical user interface 500, 600, 700. Each of the server computers 136, 138, 140 in the rack 132, 133 uses electric power at a rate associated with a corresponding duty cycle and power rating, and the sum of the electric power usage of each of the server computers 136, 138, 140 forms a total rack power usage. The input data includes a power usage limit for the rack 132, 133 of server computers 136, 138, 140 and at least one of a priority assignment, minimum duty cycle setting, and power zone setting for at least one of the server computers 136, 138, 140. The functions further include, as shown in steps 305, 307, 309, 311, 315, causing a power controller 143 that is operatively coupled to the rack 132, 133 of server computers 136, 138, 140 and communicatively connected to the remote management computer 110 over the internet connection 122 to control the power usage of each of the server computers 136, 138, 140 according to the corresponding user input data, to cause the total rack power usage to be at or below the rack power usage limit.

In one embodiment, the minimum duty cycle setting for a particular one of the server computers 136, 138, 140 is associated with a minimum amount of time, over a predetermined period of time, that the server computer is at least partially operative to perform at least one computing function for a remote computer. The priority assignment for a particular one of the server computers 136, 138, 140 is associated with the importance of at least one particular computing function performed by the server computer relative to the importance of at least one different computing function performed by at least one of the other server computers. The power zone setting for a particular server computer in the rack 132, 133 is associated with the power rating of a particular one of the server computers 136, 138, 140 relative to at least one of a predetermined range of power rating values and a power rating of the particular one of the server computers relative to the power rating of each of the other server computers. In one embodiment, the power controller 143 includes at least one power distribution unit 20 (PDU) 134 that is operatively connected to a main power input and operative to provide power to at least one of the server computers 136, 138, 140.

In one embodiment, the function shown in steps 305, 307, 309, 311, 313, 315 of causing the total rack power usage to be at or below the rack power usage limit includes the function of, as shown in step 311, causing the at least one PDU 134 to selectively reduce the duty cycle of a particular one of the server computers 136, 138, 140 having at least one of a lower priority than at least one of the other server computers 136, 138, 140 and a higher power zone setting than at least one of the other server computers 136, 138, 140.

In one embodiment, the power controller 143 further includes a power usage monitor 142 that is operative to monitor power usage of each of the server computers 136, 138, 140 and the total rack power usage, and to provide corresponding power usage data to the remote management computer 110 over the communications link 122. In one embodiment, the function shown in step 305 of monitoring the power usage of each of the server computers 136, 138, 140 and the total rack power usage includes determining the power usage of each of the server computers 136, 138, 140 and the total rack power usage over a predetermined period of time, respectively.

In one embodiment, the function shown in steps 305, 307, 309, 311, 313, 315 of causing the total rack power usage to be at or below the predetermined group power usage limit further includes performing the function of, as shown in steps 305, 307, 309, 311, causing the power usage monitor 142 to determine the total rack power usage over the predetermined amount of time prior to the reduction of the duty cycle and after the reduction of the duty cycle, and the function of, if it is determined in steps 305, 307, 309 by the power usage monitor 142 that the total rack power usage exceeds the rack power usage limit after the reduction of the duty cycle of the at least one of the server computers 136, 138, 140, performing step 311 or step 313. In step 311, the at least one PDU 134 is caused to reduce the duty cycle of an additional at least one of the server computers 136, 138, 140 according to the user input data. In step 313, the user 112 is alerted to adjust at least one of the priority assignment and power zone setting for at least one of the server computers 136, 138, 140.

In one embodiment, if the power usage monitor 142 determines in steps 305, 307, 309 that the total rack power usage exceeds the rack power usage limit after the reduction of the duty cycle of the at least one of the server computers 136, 138, 140, then at least one of the plurality of PDUs 134 is caused to reduce the duty cycle of additional server computers in the rack 132, 133 until the total rack power usage is at or below the rack power usage limit.

Now referring specifically to FIG. 1, in one embodiment the present invention relates to a computer system 100 for remotely managing electric power usage of a plurality of target computers. A user 112 interacts with a remote management computer 110 executing a network interface application 116, to manage electric power usage at a data center facility 130 over a network communications link 114 that connects the remote management computer 110 to the network 120 and another network communications link 122 that connects the network 120 to the data center 130. More particularly, the remote management computer 110 is communicatively connected to target computers housed at the data center 130. In the embodiment shown in FIG. 1, the network 120 corresponds to a WAN, LAN, or internet connection and the communication links 114 and 122 may utilize physical network cables or wireless connection means such as 802.11 or WiMax-based communication hardware to enable data communication between the remote management computer 110 and target computers housed at the data center 130. As will be further described below with reference to embodiments shown in FIGS. 5-7, the user 112 may provide input data by interacting with user controls that are associated with the network interface application 116 and graphically displayed on the remote management computer 110. The functionality of the network interface application 116 may be incorporated into a remote management browser program such as Internet Explorer® from Microsoft® Corporation of Redmond, Wash.

In the embodiment shown in FIG. 1, the data center 130 houses a plurality of target computers arranged within racks 132, 144, and 156. As shown, rack 132 includes target computers 136, 138, 140, which are configured to function as server computers. Rack 144 includes target computers 148, 150, and 152, and rack 156 includes target computers 160, 162, and 164. The target computers in each of the racks 132, 144, and 156 are connected to the communications link 122, as shown by communication link segments 122a, 122b, and 122c, respectively.

As will be further described below with reference to FIG. 2, electric power is received at the data center 130 through source power lines 170 and is provided to the target computers in each rack via corresponding power distribution units (PDUs). As shown in FIG. 1, the rack 132 with target computers 136, 138, and 140 has a corresponding PDU 134 that is electrically connected to the source power lines 170 by a power line segment 170a. Similarly, the rack 144 with target computers 148, 150, and 152 has a corresponding PDU 146 that is electrically connected to the source power lines 170 by a power line segment 170b, and the rack 156 with target computers 160, 162, and 164 has a corresponding PDU 158 that is electrically connected to the source power lines 170 by a power line segment 170c. The racks 132, 144, 156 also have power usage monitors 142, 154, and 166 connected to the respective PDUs 134, 146, and 158.

Figure 2:
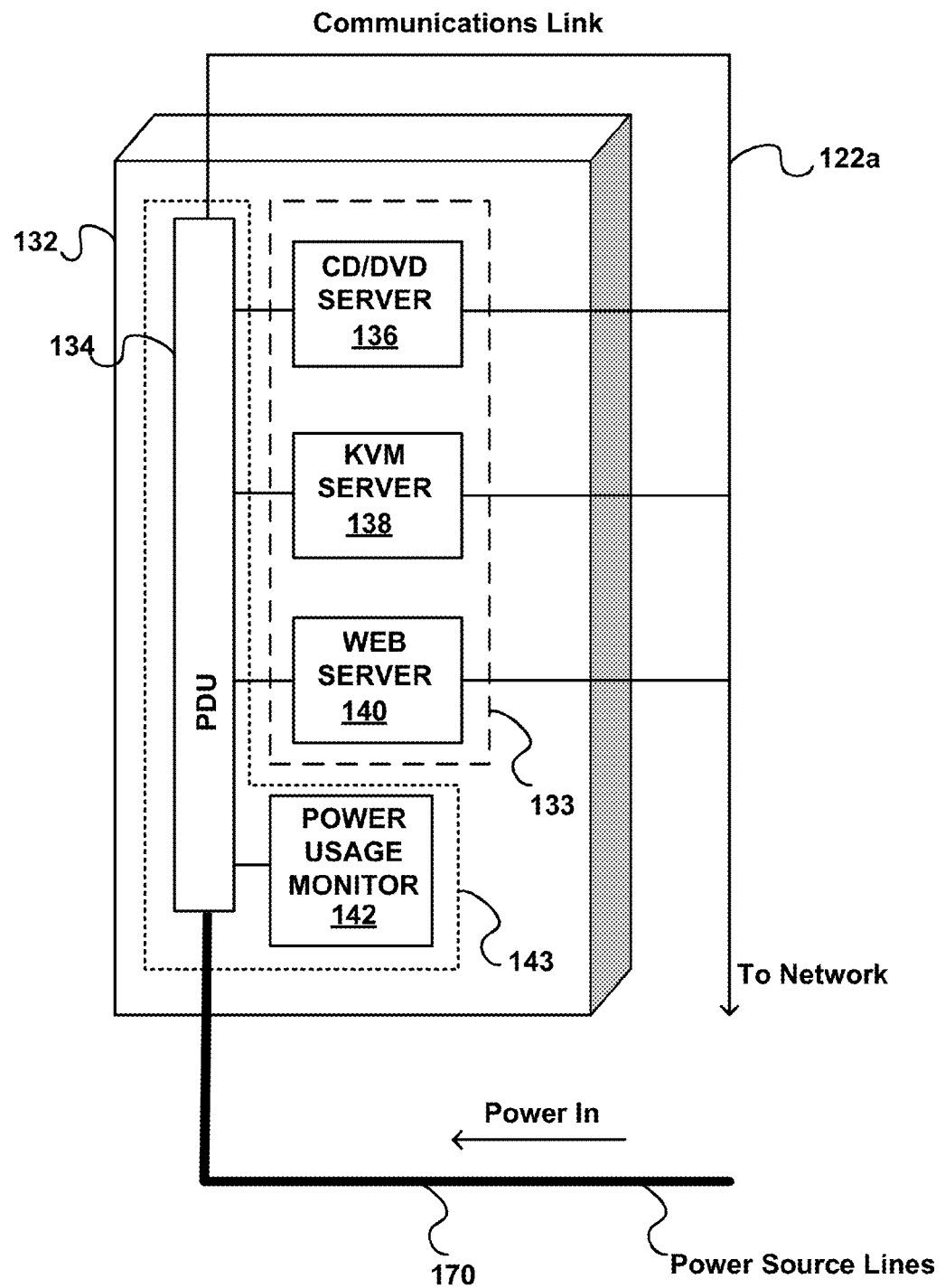
FIG. 2 schematically shows a particular rack of target computers in the computer system according to the embodiment illustrated in FIG. 1.

FIG. 2 schematically shows a representative one of the racks of target computers in the embodiment of FIG. 1, in further detail. As shown, the rack 132 includes three target computers 136, 138, 140 arranged in a group 133. Those skilled in the art will recognize that, in operation, a computer consumes electric power at a rate associated with a corresponding duty cycle and power rating, where duty cycle relates to an amount of time that a device is in an active state as a fraction of the total time elapsed over a predetermined period, and the power rating of a device relates to a guideline set by equipment manufacturers as a maximum power to be used with that device. Accordingly, each of the target computers 136, 138, 140 in the group 133 uses electric power at a rate associated with a corresponding duty cycle and power rating, and the sum of the power usage for each of the target computers 136, 138, 140 in the group 133 forms a total group power usage, also referred to herein as a "total rack power usage."

The remote management computer 110 shown in FIG. 1 is communicatively connected to the group 133 of target computers 136, 138, 140 in the rack 132 over the communications link 122a, which as shown in FIG. 1 is a communications link segment that is operatively coupled to the main communications link 122 to the network 120 and from the network 120 to the remote management computer 100 over communications link 114. The remote management computer 110 is operative to receive user input data that includes a total group power usage limit and one or more of a priority assignment, minimum duty cycle setting, and power zone setting for one or more of the target computers 136, 138, 140, in response to an action of a user 112. A power controller 143 is operatively coupled to the target computers 136, 138, 140 and communicatively connected to the remote management computer 100. The power controller 143 is operative control the power usage of each of the target computers 136, 138, 140, according to the corresponding user input data, to cause the total group power usage to be at or below the group power usage limit.

The minimum duty cycle setting for a particular one of the target computers 136, 138, 140 is associated with a minimum amount of time, over a predetermined period of time, that the particular target computer is at least partially operative to perform one or more computing functions for a remote computer, such as providing a service or other resource to multiple remote computer users over a network communications link. As shown in FIG. 2, the target computers 136, 138, and 140 provide for CD/DVD redirection, KVM redirection, and provide web services, for instance in the configuration of a DNS server, respectively. The target computers 136, 138, 140 may alternatively be configured perform functions other than CD/DVD redirection, KVM redirection, and/or web services. For example, the target computers 136, 138, 140 may alternatively be configured to function as one or more of a text console redirection server, USB flash drive redirection server, mass storage server, mail server, FTP server, VPN server, DHCP server, backup server, and/or proxy server.

The priority assignment for a particular one of the target computers 136, 138, 140 in the group 133 is associated with the importance of at least one particular computing function performed by the particular target computer relative to one or more different computing functions performed by one or more of the other target computers 136, 138, 140 in the group 133. The power zone setting for a particular target computer in the group 133 is associated with the power rating of the particular target computer relative to a predetermined range of power rating values and/or power rating of the particular target computer relative to one or more of the other target computers in the group 133.

As shown in FIG. 2, the power controller 143 includes a power distribution unit (PDU) 134 that is operatively connected to a main power input 170 and operative to provide power to the target computers 136, 138, 140 according to the user input data. As will be described further with reference to FIG. 3, the function of causing the total group power usage to be at or below the group power usage limit includes causing the at least one PDU 134 to selectively reduce the duty cycle of a particular one or more of the target computers 136, 138, 140 to a reduced duty cycle, according to the corresponding priority assignment and/or power zone setting for the particular one or more target computers 136, 138, 140, and such that the reduced duty cycle is at or above the corresponding minimum duty cycle.

The power controller 143 also includes a power usage monitor 142 that is operative to monitor power usage of each of the target computers 136, 138, 140 and the total group power usage, and to provide corresponding power usage data to the remote management computer 110 over the communications links 114, 122 through network 120. Monitoring the power usage of each of the target computers 136, 138, 140 and the total group power usage includes determining the power usage of each of the target computers 136, 138, 140 and the total group power usage over a predetermined period of time, respectively.

More specifically, the function of causing the total group power usage to be at or below the predetermined group power usage limit includes causing the power usage monitor 142 to perform functions that include determining the total group power usage over the predetermined amount of time prior to the reduction of the duty cycle and after the reduction of the duty cycle and, if the power usage monitor 142 determines that the total group power usage exceeds the group power usage limit after the reduction of the duty cycle of the one or more target computers 136, 138, 140, causing the PDU 134 to reduce the duty cycle of an additional one or more of the target computers 136, 138, 140 according to the user input data and/or alerting the user 112 to adjust the priority assignment and/or power zone setting for one or more of the target computers 136, 138, 140.

It should be appreciated that although the racks in the embodiment shown in FIG. 1 and FIG. 2 each include three target computers, it is within the scope of the present invention to provide more or less than three target computers in a single rack. Also, it should be appreciated that it is within the scope of the invention to configure the power controller 143 to provide power only to a specific one or more of the target computers 136, 138, 140, and that the power controller 143 may include a plurality of individual PDUs that are each assigned to one or more of the particular target computers 136, 138, 140.

Figure 3:
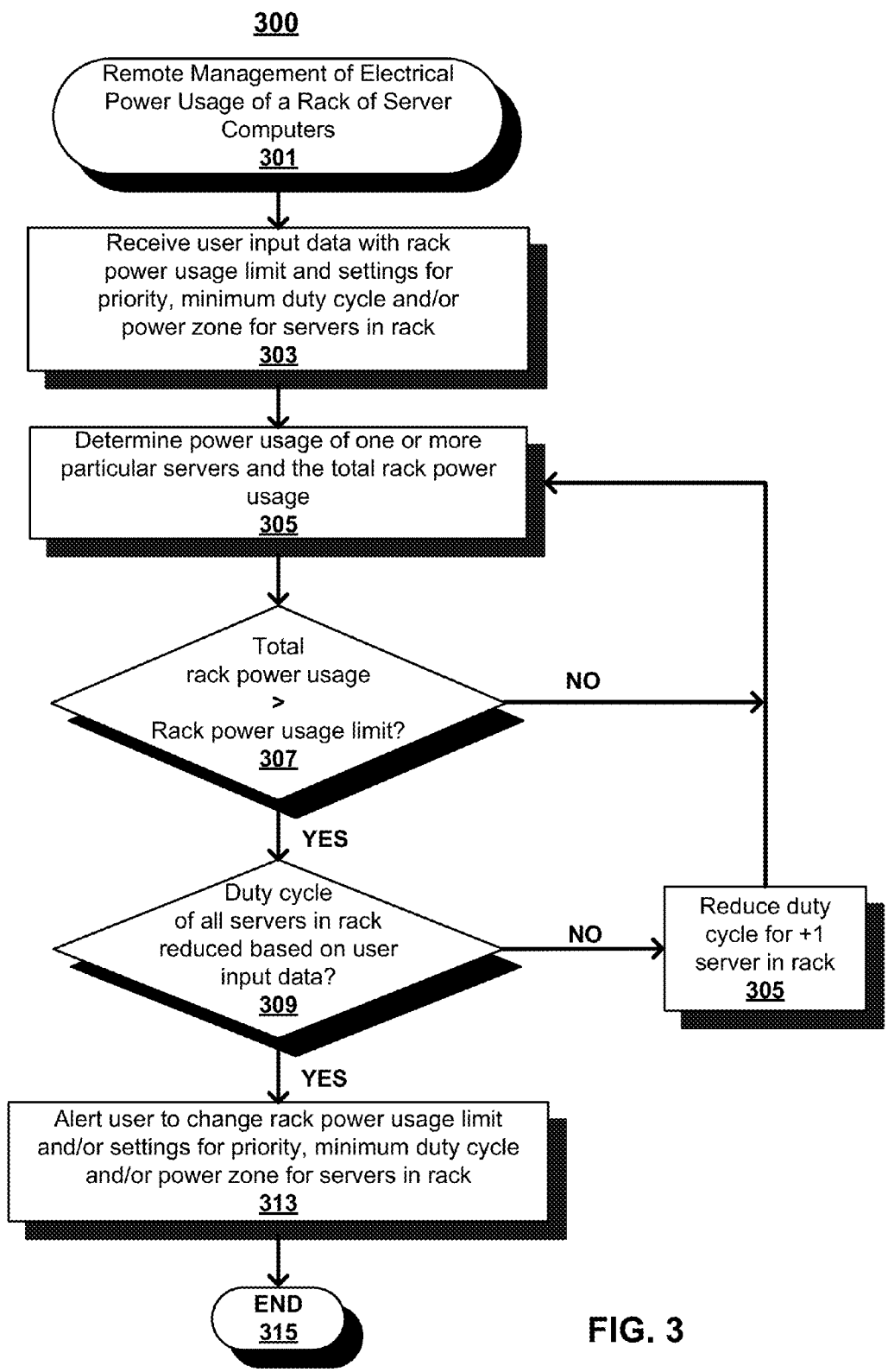
FIG. 3 shows a flow chart illustrating operational steps of a computer-implemented method for remote management of electric power usage of a group of target computers configured as server computers in a rack, according to one embodiment of the present invention.

Now referring specifically to FIG. 3, a flow chart 300 illustrates operational steps of a computer-implemented method for remote management of electric power usage of a group of target computers configured as server computers in server rack, according to one embodiment of the present invention. Those skilled in the art will recognize that the operational steps of the method may be implemented as a routine executed by one or more programmable processors of a computer, for example according to computer-executable instructions stored on a tangible, computer-readable medium.

The operational steps of the method begin at step 301 and then immediately proceed to step 303, where user input data is received that includes a rack power usage limit and settings for priority, minimum duty cycle, and/or power zone settings for one or more server computers in the rack. Next, at step 305, the power usage of one or more particular servers in the rack is determined, as well as the total rack power usage. From step 305, operational flow proceeds to step 307. At step 307, it is determined whether the total rack power usage exceeds the rack power usage limit. If the total rack power usage does not exceed the rack power usage limit, then operational flow proceeds along the "No" path from step 307 back to step 305. If the total rack power usage does exceed the rack power usage, then operational flow proceeds along the "Yes" path to step 309. At step 309, it is determined whether the duty cycle for each and every one of the server computers in the rack has been reduced based on the settings contained in the user input data. If the duty cycle for each and every server computer in the rack has not been reduced based on the settings contained in the user input data, then operational flow proceeds along the "No" path from step 309 to step 311, where the duty cycle for an additional server computer in the rack is reduced, and then operational flow returns back to step 307. If the duty cycle of each and every one of the server computers in the rack has been reduced based on the settings contained in the user input, then operational flow proceeds along the "Yes" path from step 309 to step 313, where the user is alerted to change the rack power usage limit and/or settings for one or more of priority, minimum duty cycle, and power zone settings for one or more server computers in the rack. From step 313, operational flow ends at step 315.

Figure 4:
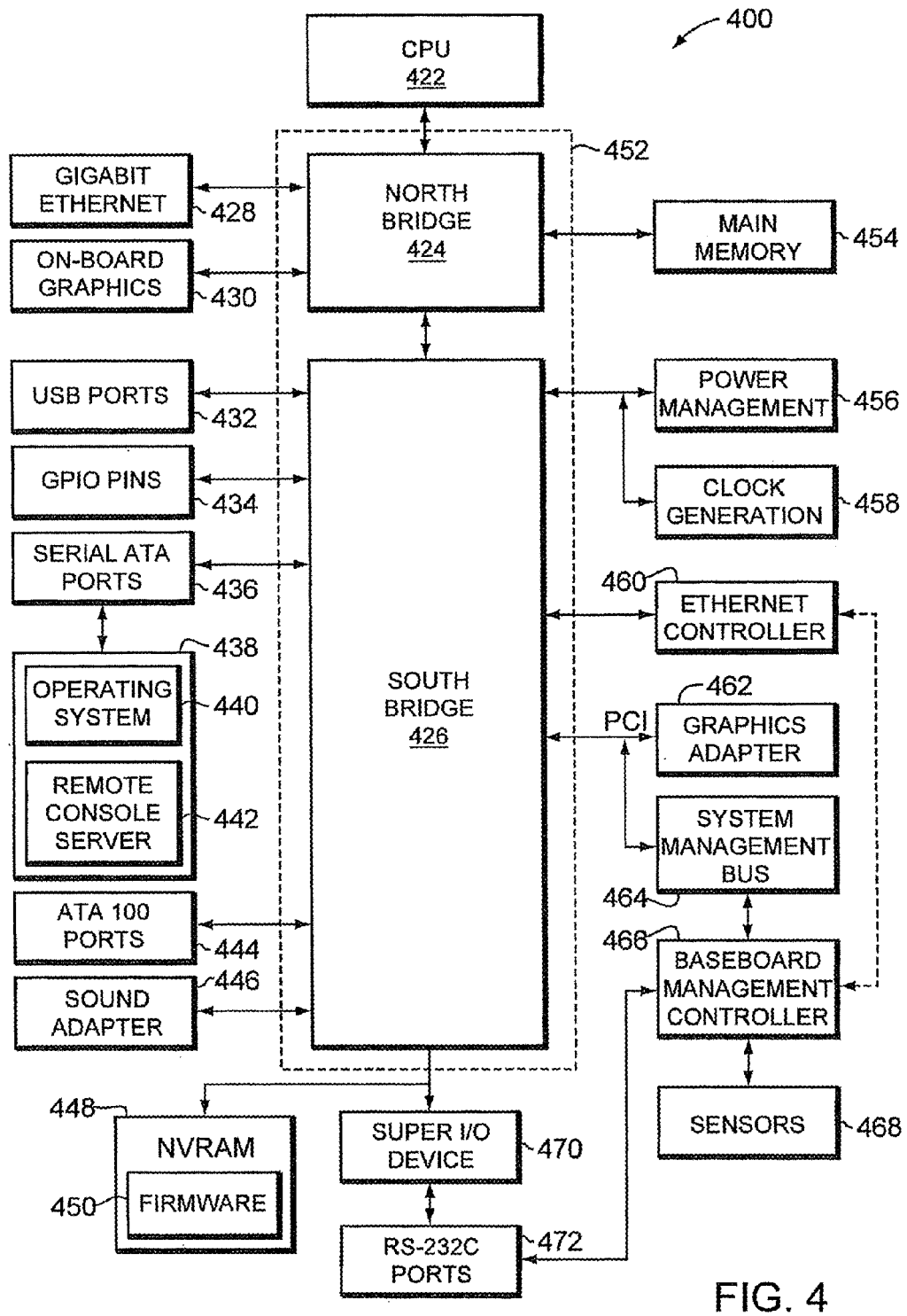
FIG. 4 schematically shows architecture of a computer system according to one or more embodiments of the present invention.

Now referring specifically to FIG. 4, computer architecture is schematically shown for various computing systems utilized according to one or more embodiments of the present invention. It should be appreciated that although the embodiments described herein are discussed in the context of server computers, other types of computing devices such as personal desktop or laptop computers, workstations, and wireless handheld computers may be utilized. Further, those skilled in the art will recognize that the architecture shown in FIG. 4 may be utilized to embody a managed host computer or a remote management computer.

The architecture shown in FIG. 4 corresponds to a computer 400 having a baseboard, or "motherboard", which is a printed circuit board to which components or devices may be connected by way of a system bus or other electric communication path. In one embodiment, a central processing unit ("CPU") 422 operates in conjunction with a chipset 452. The CPU 422 is a standard central processor that performs arithmetic and logical operations necessary for the operation of the computer. The chipset 452 includes a north bridge 424 and a south bridge 426, where the north bridge 424 provides an interface between the CPU 422 and the remainder of the computer 400. The north bridge 424 also provides an interface to a random access memory ("RAM") used as the main memory 454 in the computer 400 and, optionally, to an onboard graphics adapter 440. The north bridge 424 may also include functionality for providing networking functions through a gigabit Ethernet adapter 428. The gigabit Ethernet adapter 428 is operative to connect the computer 400 to another computer via a network. Connections which may be made by the network adapter 428 include LAN or WAN connections. As shown, the north bridge 424 is connected to the south bridge 426.

The south bridge 426 is operative to control many of the input/output functions of the computer 400. In particular, the south bridge 426 may provide one or more universal serial bus ("USB") ports 442, an Ethernet controller 460, and one or more general purpose input/output ("GPIO") pins 444. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment ("SATA") adapter for providing one or more serial ATA ports 446. The serial ATA ports 446 may be, in turn, connected to one or more mass storage devices storing an operating system 440 and application programs 442, such as the SATA disk drive 448. Those skilled in the art will recognize that an operating system 440 has a set of programs that control operations of a computer and allocation of resources. An application program is software that runs on top of the operating system software, or other runtime environment, and uses computer resources to perform application specific tasks desired by the user.

The mass storage devices connected to the south bridge 426, and their associated computer-readable media, provide non-volatile storage for the computer 400. Although the description of computer-readable media contained herein refers to a mass storage device such as a hard disk or CD-ROM drive, those skilled in the art will recognize that computer-readable media can be any available media that can be accessed by the computer 400. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400. As described briefly above, the south bridge 426 may include a system management bus 464. The system management bus 464 may include a baseboard management controller ("BMC") 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

It should be appreciated that the computer 400 may comprise other types of computing devices known to those skilled in the art. It is also contemplated that the computer 400 may not include all of the components shown in FIG. 4 and/or may include other components that are not explicitly shown in FIG. 4.

IMPLEMENTATIONS AND EXAMPLES OF THE INVENTION

Without intent to limit the scope of the invention, exemplary systems and methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

Example 1

This Example describes an implementation of one or more embodiments of the present invention for controlling the energy usage of a data center housing racks of server computers, by managing the power usage of each individual rack, to maintain the total power usage of the rack at or below a desired power usage level. In an initial stage of discovering specific information for one or more particular server computers in a selected rack that is to be managed, using a list of preset internet protocol (IP) addresses for the respective devices in each rack, discovery is performed to locate PDUs at the data center that are operatively connected to the rack and thereby connected to the server computers in the rack. The device power rating associated with each individual server computer in the rack, as set by the manufacturer, is discovered. The operating system executing on each of the individual servers is determined through data communication between the rack and a remote management program, such as through a network interface application executing on a remote management computer. This determination can be performed by utilizing SSH, SNMP, and/or WMI protocol, where SSH is associated with a Linux operating system and WMI is associated with a Microsoft® Windows® operating system.

Figure 5:
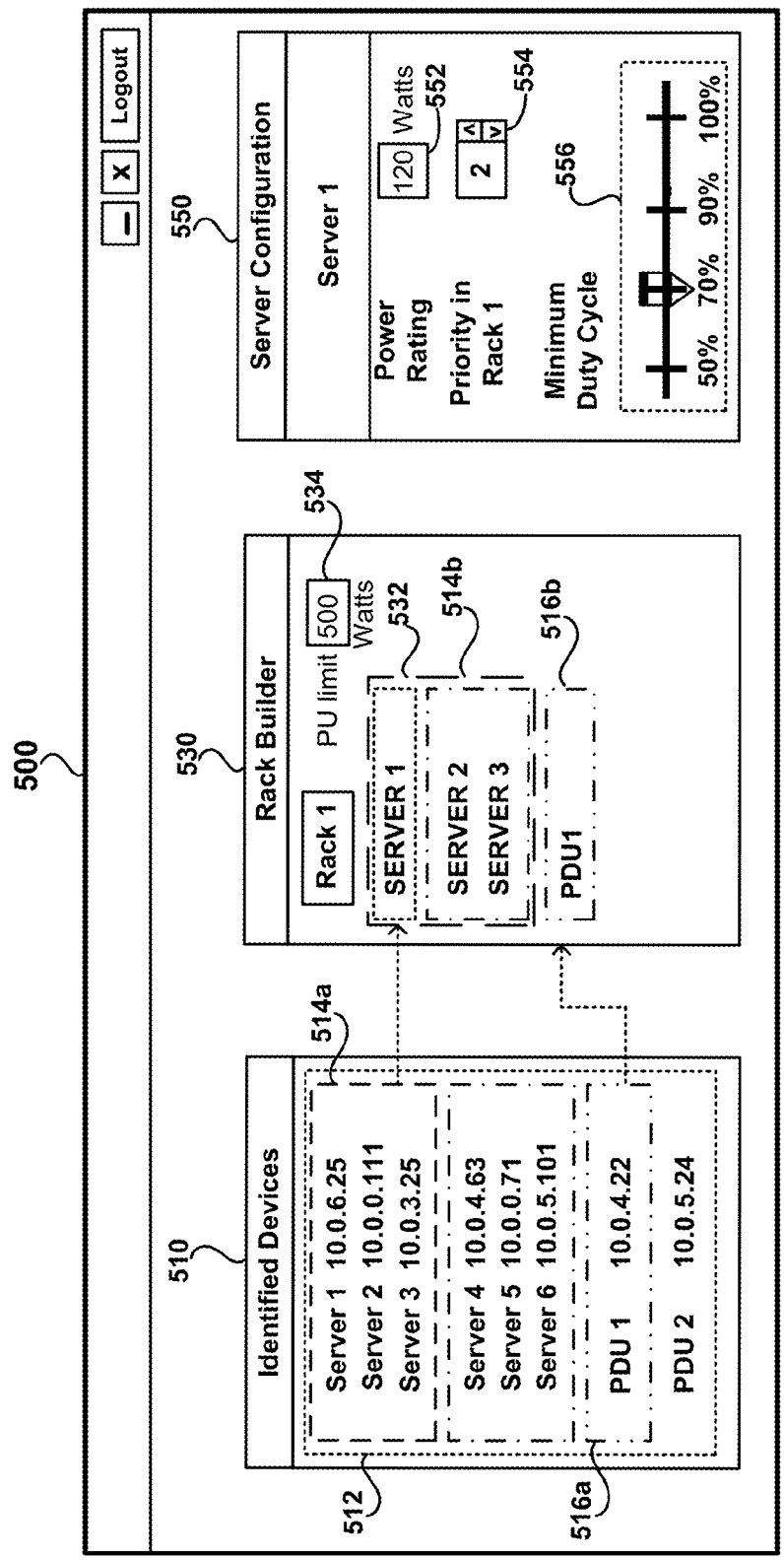
FIG. 5 illustrates a graphical user interface display with racks and particular server computers and PDUs of a data center, according to one embodiment of the present invention.

Now referring specifically to FIG. 5, a graphical user interface display 500 is shown with racks and particular server computers and PDUs of a data center, according to one embodiment of the present invention. In the graphical user interface display 500 in FIG. 5, operative devices are discovered and identified, and shown to a user in the form of a list 512 that includes the identified Servers 1-6 and PDUs 1-2 and their corresponding IP addresses. Following the initial discovery stage, functions are performed to "build" a rack of server computers to be remotely managed. In the initialization stage, a remote user inputs specific settings for operation of the rack. A total rack power usage limit is assigned, for example through user interaction with a graphical user input control such as the input control box 534 illustrated in the graphical user interface display 500 shown in FIG. 5. As specifically shown in FIG. 5, one or more selected servers or groups of servers and one or more PDUs in section 510 can be selected and dynamically moved into a desired rack to build, as illustrated by Servers 1-3 that form a group 514a are moved by user interaction to the Rack 1 list shown in the Rack Builder display section 530. The group 514a is moved from the list in section 510 to the Rack 1, which becomes group 514b. The user interaction to perform this moving operation may be through a pointer-based drag-and-drop operation, such as by holding down a mouse key to select the items in the initial location, sliding the mouse to move the selected items, and releasing the mouse key to drop the items in the new location.

Also, for each server computer in the rack that is to be remotely managed, the user can input a minimum duty cycle setting through interaction with a graphical user input control such as the sliding control bar 556 illustrated the graphical user interface 500 shown in FIG. 5. According to an exemplary embodiment, the user may assign a minimum duty cycle of 70% for a first server in a remotely managed rack, a minimum duty cycle of 60% for a second server, and a minimum duty cycle of 50% for a third server. In the same way, one or more of the identified PDUs 1-2 listed in display section 510 can be selected and moved to the Rack Builder section 530. For example, as shown, a user can select and move PDU 1 from section 510 to section 530, to thereby complete the Rack 1 build having the desired servers and a PDU. The user can input the rack power usage limit in input box 534, shown in FIG. 5 as 500 Watts. The configuration of a particular server can be performed by user interaction with display section 550 in connection with display section 530. As shown, Server 1 labeled as 532 can be selected and its settings customized through the user controls. As shown, through an input box 552, a user can provide the device power rating, shown here as 120 Watts, and can set the duty cycle for Server 1, shown as 70%, through the use of a sliding control bar 556.

Furthermore, the user may assign relative priorities for the other server computers (Server 2 and Server 3) based on the deemed importance a particular server has in comparison with others. For instance, as shown in display section 550, a priority rating of 1 is assigned to Server 1, which is an email server, using the up-down control arrows 554. A user may thereby assign the highest priority assignment to Server 1 of Rack 1, meaning the user deems it critical that the Server 1 have the highest availability over a given period of time to perform email services for remote computers, relative to Server 2 and Server 3, which may be configured as a backup email server and media server, respectively.

Now referring specifically to FIG. 6, a graphical user interface display 600 is shown with user input controls that include controls for receiving user input associated with a power zone setting for one or more target computers, respectively, according to one embodiment of the invention. Particularly, a graphical user interface display 600 is shown which includes a display section 610 for establishing "power zone" settings based on a manufacturer-given power rating. For example, the user may establish multiple levels of quantitative ranges, using input boxes 612-622. Through interaction with input boxes 620 and 622, a user may set quantitative values to establish a LOW power zone of 1-100 Watts. Using input boxes 616 and 618, a user may establish a MEDIUM power zone of 101-250, and through input boxes 620 and 622, a user may establish a HIGH power zone of 251-500 Watts.

Now referring specifically to FIG. 7, a graphical user interface display 700 is shown with user input controls for receiving user input associated with configuring customized power management policies for particular server computers and PDUs in racks at a data center, according to one embodiment of the present invention. A user interacts with graphically displayed controls to configure a rack of servers to operate according to selected parameters, over a selected period of time and in either a fully or partially automated fashion. Specifically, as shown, a user inputs a policy to effectively govern the duty cycle of servers in a rack over a five hour period in one day. Further, the duty cycle parameters are selected to affect only servers that have a priority assignment within an upper and/or lower boundary. In the embodiment shown, by interacting with the input boxes 712 and 714, a user provides a particular date or range of dates for which the parameters of the policy are to be enforced. This particular period of time may correspond to a time of day with lower server traffic as compared to other hours, for instance peak hours versus off-peak hours. Further, by selecting the check box 730 or the check box 732, the user can indicate whether a maximum priority assignment or a minimum priority assignment is being set, and in conjunction, by using up-down arrows in input box 728, the user can select a specific priority assignment values for the minimum or maximum priority assignment to establish the particular boundaries. By using sliding control bar 734, a user can specify the duty cycle that is to be applied to one or more of the servers in the rack that have the user-set priority criteria.

More particularly, in display section 710, a user can set a time frame in which the policy restrictions are to apply, through entering dates in input boxes 712 and 714. Through the use of input boxes 716, 718, 720, 722, a user can set the specific hours for the settings to remain in effect. Using check boxes 724 and 726, in conjunction with up-down input box 728, a user sets priority assignment criteria for particular servers in a rack. Through the use of check boxes 730 and 732 in conjunction with sliding control bar 734, the upper or lower boundaries for duty cycle operations of one or more servers that fall within the other user-set criteria can be provided. In the example shown, a user has established policy parameters which in effect hold any servers in the rack that have a priority less than 2, for example, a priority assignment of 3 in a rack with three total servers, to operate with a duty cycle of at least 60%. In the example shown, enforcement of these established settings is set by the user to occur between the hours of 1:00 AM to 6:00 AM on May 11.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for remotely managing electric power usage of a plurality of target computers, comprising:
 (a) a plurality of computer groups, wherein each of the computer groups comprises:
  (i) a plurality of target computers, each target computer in the computer group using electric power at a rate associated with a corresponding duty cycle and power rating, and wherein the sum of the power usage for each of the target computers in the computer group forms a total group power usage; and
  (ii) a power controller operatively coupled to the target computers, configured to control the power usage of each of the target computers according to corresponding user input data to cause the total group power usage of the computer group to be at or below a total group power usage limit; and
 (b) a remote management computer communicatively connected to each of the target computers and the power controller of each of the computer groups over a communications link, wherein the remote management computer is configured to
  receive the user input data including the total group power usage limit of the computer groups and at least one of a priority assignment of each of the computer groups, minimum duty cycle setting, and power zone setting for at least one of the target computers of each of the computer groups, in response to an action of a user;

discover all of the power controllers and the target computers of the system;

monitor the power usage of each of the target computers of the computer groups and the total group power usage of the computer groups; and when the total group power usage of one of the computer groups exceeds the total group power usage limit of the one of the computer groups, control the power controller of the one of the computer groups to cause the total group power usage of the one of the computer groups to be at or below the total group power usage limit.

2. The system of claim 1, wherein the minimum duty cycle setting for a particular one of the target computers is associated with a minimum amount of time, over a predetermined period of time, that a target computer is at least partially operative to perform at least one computing function for a remote computer, wherein the priority assignment for a particular one of the target computers is associated with the importance of at least one particular computing function performed by the target computer relative to at least one different computing function performed by at least one of the other target computers in each computer group, and wherein the power zone setting for a particular target computer is associated with the power rating of a particular one of the target computers relative to at least one of a predetermined range of power rating values and a power rating of the target computer relative to the other target computers in each computer group.

3. The system of claim 2, wherein for each of the computer groups, the power controller comprises at least one power distribution unit (PDU) that is operatively connected to a main power input and operative to provide power to the target computers according to the user input data.

4. The system of claim 3, wherein causing the total group power usage to be at or below the group power usage limit comprises causing the at least one PDU to selectively reduce the duty cycle of a particular at least one of the target computers to a reduced duty cycle, according to at least one of the corresponding priority assignment and power zone setting for the particular at least one target computer, wherein the reduced duty cycle is at or above the corresponding minimum duty cycle.

5. The system of claim 4, wherein for each of the computer groups, the power controller further comprises a power usage monitor that is operative to monitor the power usage of each of the target computers and the total group power usage and to provide corresponding power usage data to the remote management computer over the communications link, and wherein monitoring the power usage of each of the target computers and the total group power usage comprises determining the power usage of each of the target computers and the total group power usage over a predetermined period of time, respectively.

6. The system of claim 5, wherein causing the total group power usage to be at or below the predetermined group power usage limit further comprises causing the power usage monitor to perform functions comprising:

(a) determining the total group power usage over the predetermined amount of time prior to the reduction of the duty cycle and after the reduction of the duty cycle; and (b) when the power usage monitor determines that the total group power usage exceeds the group power usage limit after the reduction of the duty cycle of the at least one of the target computers, performing one of the functions of:

(i) reducing the duty cycle of an additional at least one of the target computers according to the user input data; and (ii) alerting the user to adjust at least one of the priority and power zone setting for at least one of the target computers.

7. The system of claim 1, wherein the communications link comprises at least one of a WAN connection, LAN connection, and internet connection.

8. The system of claim 7, wherein the communications link comprises an internet connection and the remote management computer is further operative to display a web-based user interface with user controls to the user and the user input data is received in response to an interaction of the user with at least one of the displayed user controls.

9. The system of claim 1, wherein the target computers in each computer group are co-located at a data center.

10. A non-transitory computer-readable medium having stored thereon computer-executable instructions which, when executed by one or more processors, perform functions for remotely managing electric power usage of a plurality of target computers of a system, the functions comprising:

(a) receiving user input data in response to an interaction of a user with a remote management computer, wherein the remote management computer is communicatively connected to a plurality of computer groups of the system over a communications link, wherein each computer group comprises a plurality of target computers and a power controller, wherein for each of the computer groups, the power controller is operatively coupled to the target computers, and each target computer uses electric power at a rate associated with a corresponding duty cycle and power rating, wherein the sum of the electric power usage of each of the target computers forms a total group power usage, and wherein the user input data includes a power usage limit for the group of target computers and at least one of a priority assignment, minimum duty cycle setting, and power zone setting for at least one of target computers, and wherein the power controller is operatively coupled to the target computers and configured to control the power usage of each of the target computers according to corresponding user input data to cause the total group power usage of the computer group to be at or below a total group power usage limit;

(b) discovering, by the remote management computer, all of the target computers and the power controller of the system;

(c) monitoring the power usage of each of the target computers of the computer groups and the total group power usage of each of the computer groups; and (d) when the total group power usage of one of the computer groups exceeds the total group power usage limit of the one of the computer groups, controlling, by the remote management computer, the power controller of the one of the computer groups to cause the total group power usage of the one of the computer groups to be at or below the group power usage limit.

11. The non-transitory computer-readable medium of claim 10, wherein the minimum duty cycle setting for a particular one of the target computers is associated with a minimum amount of time, over a predetermined period of time, that the target computer is at least partially operative to perform at least one computing function, wherein the priority assignment for a particular one of the target computers is associated with the importance of at least one particular computing function performed by the target computer relative to at least one different computing function performed by at least one of the other target computers, and wherein the power zone setting for a particular one of the target computers is associated with the power rating of the target computer relative to at least one of a predetermined range of power rating values and a power rating of the particular target computer relative to the other target computers.

12. The non-transitory computer-readable medium of claim 11, wherein for each of the computer groups, the power controller comprises at least one power distribution unit (PDU) that is operatively connected to a main power input and operative to provide power to the target computers according to the user input data.

13. The non-transitory computer-readable medium of claim 12, wherein causing the total group power usage to be at or below the group power usage limit comprises causing the at least one PDU to selectively reduce the duty cycle of a particular at least one of the target computers to a reduced duty cycle according to at least one of the corresponding priority assignment and power zone setting for the at least one target computer, wherein the reduced duty cycle is above the minimum duty cycle for the particular at least one target computer.

14. The non-transitory computer-readable medium of claim 13, wherein for each of the computer groups, the power controller further comprises a power usage monitor that is operative to monitor power usage of each of the target computers and the total group power usage and to provide corresponding power usage data to the remote management computer over the communications link, and wherein monitoring the power usage of each of the target computers and the total group power usage comprises determining the power usage of each of the target computers and the total group power usage over a predetermined period of time, respectively.

15. The non-transitory computer-readable medium of claim 14, wherein causing the total group power usage to be at or below the predetermined group power usage limit further comprises the functions of:
 (a) causing the power usage monitor to determine the total group power usage over the predetermined amount of time prior to the reduction of the duty cycle and after the reduction of the duty cycle; and
 (b) when the power usage monitor determines that the total group power usage exceeds the group power usage limit after the reduction of the duty cycle of the at least one of the target computers, causing the at least one PDU to further perform one of the functions of:
  (i) reducing the duty cycle of an additional at least one of the target computers according to the user input data; and
  (ii) alerting the user to adjust at least one of the priority assignment and power zone setting for at least one of the target computers.

16. The non-transitory computer-readable medium of claim 10, wherein the communications link comprises at least one of a WAN connection, LAN connection, and internet connection.

17. The non-transitory computer-readable medium of claim 16, wherein the communications link comprises an internet connection and the functions performed further comprise causing the remote management computer to display a web-based user interface with user controls and wherein the user input data is received in response to an interaction of the user with at least one of the displayed user controls.

18. The non-transitory computer-readable medium of claim 10, wherein the target computers in each computer group are co-located at a data center.

19. A non-transitory computer-readable medium having stored thereon computer-executable instructions which, when executed by one or more processors, perform functions for remotely managing electric power usage of a plurality of racks of server computers of a server system, the functions comprising:
 (a) receiving user input data from a user of a web-based graphical user interface displayed on a remote management computer that is communicatively connected to a plurality of racks of server computers over an internet connection, in response to an interaction of the user with the graphical user interface, wherein each rack comprises the server computers and a power and a power controller, wherein for each rack, each server computer in the rack uses electric power at a rate associated with a corresponding duty cycle and power rating, wherein the sum of the electric power usage of each of the server computers forms a total rack power usage, and wherein the input data includes a rack power usage limit for the rack of server computers and at least one of a priority assignment, minimum duty cycle setting, and power zone setting for at least one of the server computers, and wherein the power controller is operatively coupled to the server computers and configured to control the power usage of each of the server computers according to the corresponding user input data to cause the total rack power usage to be at or below the rack power usage limit;
 (b) discovering, by the remote management computer, all of the server computers and the power controller of the server system;
 (c) monitoring the power usage of each of the racks of the server computers and the total rack power usage of each rack; and
 (d) when the total rack power usage of one of the racks exceeds the rack power usage limit, controlling, by the remote management computer, the power controller of the one of the racks to cause the total rack power usage to be at or below the rack power usage limit.

20. The non-transitory computer-readable medium of claim 19, wherein the minimum duty cycle setting for a particular one of the server computers is associated with a minimum amount of time, over a predetermined period of time, that the server computer is at least partially operative to perform at least one computing function for a remote computer,
 wherein the priority assignment for a particular one of the server computers is associated with the importance of at least one particular computing function performed by the server computer relative to the importance of at least one different computing function performed by at least one of the other server computers, and
 wherein the power zone setting for a particular server computer in one of the racks is associated with the power rating of a particular one of the target computers relative to at least one of a predetermined range of power rating values and a power rating of the particular one of the target computers relative to the power rating of each of the other server computers.

21. The non-transitory computer-readable medium of claim 20, wherein for each rack, the power controller comprises at least one power distribution unit (PDU) that is operatively connected to a main power input and operative to provide power to at least one of the server computers.

22. The non-transitory computer-readable medium of claim 21, wherein causing the total rack power usage to be at or below the rack power usage limit comprises causing the at least one PDU to selectively reduce the duty cycle of a particular one of the server computers having at least one of a lower priority than at least one of the other server computers and a higher power zone setting than at least one of the other server computers.

23. The non-transitory computer-readable medium of claim 22, wherein for each rack, the power controller further comprises a power usage monitor that is operative to monitor power usage of each of the server computers and the total rack power usage and to provide corresponding power usage data to the remote management computer over the communications link.

24. The non-transitory computer-readable medium of claim 23, wherein monitoring the power usage of each of the server computers and the total rack power usage comprises determining the power usage of each of the server computers and the total rack power usage over a predetermined period of time, respectively.

25. The non-transitory computer-readable medium of claim 24, wherein causing the total rack power usage to be at or below the predetermined group power usage limit further comprises performing the functions of:

(a) causing the power usage monitor to determine the total rack power usage over the predetermined amount of time prior to the reduction of the duty cycle and after the reduction of the duty cycle; and (b) if it is determined by the power usage monitor that the total rack power usage exceeds the rack power usage limit after the reduction of the duty cycle of the at least one of the server computers, further performing one of the functions of:
  (i) causing the at least one PDU to reduce the duty cycle of an additional at least one of the server computers according to the user input data; and
  (ii) alerting the user to adjust at least one of the priority assignment and power zone setting for at least one of the server computers.

26. The non-transitory computer-readable medium of claim 25, having further computer-executable instructions stored thereon which, when executed by one or more processors, further perform the function of:

when the power usage monitor determines that the total rack power usage exceeds the rack power usage limit after the reduction of the duty cycle of the at least one of the server computers, causing the at least one PDU to reduce the duty cycle of additional server computers in the rack until the total rack power usage is at or below the rack power usage limit.

* * * * *